(12) United States Patent
Tsusaki et al.

(10) Patent No.: US 6,423,309 B1
(45) Date of Patent: Jul. 23, 2002

(54) COMPOSITION CONTAINING GRASS PLANT, WATER-SOLUBLE DIETARY FIBERS, OLIGOSACCHARIDES, LACTIC ACID BACTERIA AND GREEN TEA

(75) Inventors: Shinji Tsusaki; Kinya Takagaki, both of Fukuoka (JP)

(73) Assignee: Toyo Shinyaku Co., Ltd. (JP)

( * ) Notice: Subject to any disclaimer, the term of this patent is extended or adjusted under 35 U.S.C. 154(b) by 0 days.

(21) Appl. No.: 09/807,243

(22) PCT Filed: Nov. 24, 2000

(86) PCT No.: PCT/JP00/08310

§ 371 (c)(1), (2), (4) Date: Apr. 10, 2001

(51) Int. Cl.[7] .......................... A01N 63/02; A61K 35/78
(52) U.S. Cl. ............... 424/93.4; 424/93.45; 424/93.44; 424/725; 424/750; 424/729
(58) Field of Search .............. 424/93.44, 93.45, 424/729, 750, 93.4, 725

(56) References Cited

U.S. PATENT DOCUMENTS 5,009,891 A  *  4/1991  Niwa et al. ............... 424/195.1
5,283,076 A  *  2/1994  Kazuyuki et al. ........... 426/575
6,060,496 A  *  5/2000  Hayashi et al. ............. 514/400

FOREIGN PATENT DOCUMENTS

| JP | 6066951 | 9/1983 |
| JP | 11276073 | 3/1998 |
| JP | 232864 | 2/1999 |
| JP | 245391 | 3/1999 |

* cited by examiner

*Primary Examiner*—David M. Naff
*Assistant Examiner*—Mike Meller
(74) *Attorney, Agent, or Firm*—Amin & Turocy, LLP

(57) ABSTRACT

A processed food excellent for activating superoxidase dismutase is disclosed. The food contains 30 to 70% by weight of barley, wheat, rye or oats; 1 to 50% by weight of water soluble dietary fibers; 1 to 10% by weight of oligosaccharides; 0.5 to 5% by weight of powdered lactic acid bacteria and 5 to 15% by weight of powdered green tea. A method of making the food and a method for activating superoxide dismutase using the food is also disclosed.

5 Claims, No Drawings

COMPOSITION CONTAINING GRASS PLANT, WATER-SOLUBLE DIETARY FIBERS, OLIGOSACCHARIDES, LACTIC ACID BACTERIA AND GREEN TEA

TECHNICAL FIELD

The present invention relates to processed food that is excellent in activating superoxide dismutase (hereinafter, referred to as SOD).

BACKGROUND ART

Young leaves of grass plants such as barley are rich in vitamins, minerals and dietary fibers, and are attracting attention as a material having the effects of adsorption of harmful substances, improvement of the intestinal environment, suppression of the absorption of cholesterol, prevention of a rapid increase in the blood glucose level after eating, etc.

On the other hand, in recent years, there have been an increasing number of reports that free radicals such as active oxygen cause a large number of diseases such as hypertension, cerebral stroke, myocardial infarction, pneumosclerosis, hepatitis, nephritis, atopic dermatitis, Parkinson's disease, cataracts, gout, pulmonary emphysema, dermatitis, gastritis, pneumonia, arthritis, stenocardia, senility, rheumatics, and arteriosclerosis. For example, it is known that when excessive active oxygen is present, normal cells are damaged and become cancer cells. At present, how to reduce such active oxygen is a serious issue to maintain our health.

In this context, health foods containing a material having SOD activities that eliminate active oxygen are commercially available. However, in view of the absorption rate of food, activation of SOD that exists in the body leads to more efficient elimination of active oxygen.

Therefore, there is a demand for health foods that activate SOD.

DISCLOSURE OF INVENTION

The inventors of the present invention conducted in-depth research on the activation of SOD and conceived the present invention as a result of finding that when young leaves of grass plants and powdered green tea are mixed, SOD that exists in the body can be activated better than when either one of them is used alone.

The present invention is directed to a processed food that is excellent in activating superoxide dismutase that contains grass plant young leaf powder and powdered green tea.

In a preferable embodiment, the processed food of the present invention further contains water-soluble dietary fibers, oligosaccharide, and lactic acid bacteria.

In a further preferable embodiment, the processed food of the present invention contains 30 to 70% by weight of grass plant young leaf powder, 1 to 50% by weight of water-soluble dietary fibers, 1 to 10% by weight of oligosaccharide, 0.5 to 5% by weight of lactic acid bacteria in the form of dry powder, and 5 to 15% by weight of powdered green tea.

In another preferable embodiment, the processed food of the present invention contains a calcium-containing substance and maltitol.

According to another aspect, the present invention is directed to a method for producing a processed food excellent in activating superoxide dismutase, including mixing grass plant young leaf power and powdered green tea.

In a preferable embodiment, the method further includes mixing water-soluble dietary fibers, oligosaccharide, and lactic acid bacteria.

In a further preferable embodiment, the method includes mixing 30 to 70% by weight of grass plant young leaf powder, 1 to 50% by weight of water-soluble dietary fibers, 1 to 10% by weight of oligosaccharide, 0.5 to 5% by weight of lactic acid bacteria in the form of dry powder, and 5 to 15% by weight of powdered green tea.

BEST MODE FOR CARRYING OUT THE INVENTION

"Grass plant young leaf powder" refers to powder from young leaves of grass plants such as barley, wheat, rye, oats or the like. Young leaves of the grass plant are obtained in the following manner, for example. Young leaves of a grass plant reaped in a period from the start of the branching stage to the early stage of the earring (when the height is about 20 to 40 cm) are washed with water or the like, and are cut to an appropriate length (for example, 10 cm). Then, a blanching (hot water) treatment, a microwave treatment, a treatment with steam or other treatments are performed to prevent the quality of the material from changing (e.g., fading of the green color or changing of the flavor), if necessary. Then, the leaves are dried until the water content is reduced to 5% or less, and are powdered. A short time blanching treatment is preferable for nutrient retention. For drying, lyophilization or drying by heating at a low temperature up to 70° C. (e.g., heating with warm air) is preferable. The obtained grass plant young leaf powder contains all the active ingredients of the leaves of the grass plant, because the powder is obtained simply by drying and powdering the leaves of the grass plant without any modifications.

Powdered green tea contains chlorophyll, carotene and amino acids such as theanine in a larger amount than green tea to be infused. Further, powered green tea contains less bitter ingredients such as catechin. However, powdered green tea, as well as green tea to be infused, is said to have the effect of suppressing cancer and many geriatric diseases, such as diabetes and hypertension.

The processed food comprising the grass plant young leaves mixed with the powdered green tea of the present invention can activate SOD that exists in the body. Furthermore, it is preferable to mix the processed food with other food materials, so that, for example, additional effects such as improvement of the taste and the flavor, and suppression of the absorption of cholesterol can be attained.

Examples of possible materials to be added include water-soluble dietary fibers, oligosaccharides, lactic acid bacteria, calcium-containing substances, and maltitol.

Young leaves of grass plants contain dietary fibers, which are mostly insoluble. Insoluble dietary fibers have the effects of preventing colon and rectum cancer and improving the intestinal environment. When the grass plant young leaf powder containing insoluble dietary fibers is mixed with water-soluble dietary fibers, the effects of suppressing the absorption of cholesterol, and suppressing an increase of the blood glucose level after eating, or other effects can be enhanced.

Examples of the water-soluble dietary fibers include alginic acid, indigestible dextrin, Guar gum hydrolysate, and glucomannan.

Oligosaccharides are generally assimilated by enterobacteria and improve the intestinal environment, and therefore oligosaccharides seem to have the same effects as insoluble dietary fibers, namely, the effects of preventing colon and rectum cancer and improving the intestinal environment.

Examples of oligosaccharides include lactulose, paratinose, fructo-oligosaccharides, raffinose, stachyose, xylooligosaccharides, maltooligosaccharides, isomaltooligosaccharides, trehalose, and galactooligosaccharides.

Similarly to oligosaccharides; lactic acid bacteria seem to improve the intestinal environment. Examples of lactic acid bacteria include *Lactobacillus acidophilus, Lactobacillus casei, Streptococcus faecalis*, and *Streptococcus thermophilus*. When using lactic acid bacteria, it is preferable to use them for powdered or liquid foods, and when the lactic acid bacteria are cultured in an appropriate medium, followed by lyophilization and added to processed foods, the lactic acid bacteria can be grown by providing moisture.

A preferable amount of grass plant young leaf powder to be mixed in a health food is 10% by weight to 90% by weight, more preferably, 30% by weight to 70% by weight, and more preferably, 30% by weight to 50% by weight.

A preferable amount of powdered green tea to be mixed is 3% by weight to 30% by weight, more preferably, 5% by weight to 15% by weight.

A preferable amount of water-soluble dietary fibers to be mixed is 1% by weight to 50% by weight, more preferably, 2% by weight to 40% by weight.

A preferable amount of oligosaccharide to be mixed is 0.1% by weight to 30% by weight, more preferably, 1% by weight to 10% by weight.

A preferable amount of lactic acid bacteria to be mixed is 0.1% by weight to 10% by weight, more preferably, 0.5% by weight to 5% by weight.

A preferable example of the mixing ratio of the mixture is 30% by weight to 70% by weight of grass plant leaf powder, 1% by weight to 50% by weight of water-soluble dietary fibers, 1% by weight to 10% by weight of oligosaccharide, 0.5% by weight to 5% by weight of lactic acid bacteria in the form of dry powder, and 5% by weight to 15% by weight of powdered green tea.

Furthermore, calcium-containing substances (e.g., egg-shell calcium, coral calcium, and pearl powder) can be added to the processed food of the present invention for the purpose of supplying calcium to the body. Maltitol and/or lactose also can be added for the purpose of raising the absorption (utilization) ratio of calcium in the body.

For example, when a food comprising 5% by weight of egg-shell calcium and 15% by weight of maltitol, in addition to the preferable example of the mixture having the above-described mixing ratio, was fed to a rat for two weeks, the absorption ratio of calcium in the body (calculated by subtracting the excretion amount from the intake amount) was about 10% higher than when only either one of the egg-shell calcium and the maltitol was added.

The calcium-containing substance can be added in an amount of 1 to 30% by weight, preferably 5 to 20% by weight, although the preferable amount depends on the composition.

The maltitol and/or lactose can be added in an amount of 10 to 60% by weight, preferably 20 to 50% by weight.

The processed food comprising the above-described components can be provided without adding any further substances or can be mixed with additional substances such as an excipient, a filler, a binder, a thickener, an emulsifier, a coloring agent, a flavoring agent, a food additive, and seasoning. For example, royal jelly, vitamin, protein, chitosan, lecithin or the like can be admixed as nutrition supplements. Further, a sugar solution and seasoning can be added to improve flavor. The food can be made in the form of a capsule such as a hard capsule and a soft capsule, a tablet or a pill, or can be powder, granules or candy-shaped, as appropriate. The food can be eaten as it is, or can be dissolved in water, warm water or milk, depending on shape and preference.

EXAMPLES

Hereinafter, the present invention will be described by way of examples, but it is not limited to the examples.

Production of Young Leaf Powder of a Grass Plant

Young leaf powder of barley was used as the grass plant young leaf powder. Simply speaking, young leaves of barley reaped when the height became about 30 cm were washed with water to remove adhered dirt, and then 500 g of the young leaves were subjected to a blanching treatment with 5 liters of hot water at 90 to 100° C. for 3 min. Then, the blanched young leaves were immersed immediately in cool water at 2 to 7° C. for 5 minutes for rapid cooling, and then centrifuged for 30 seconds to dehydrate water to some extent, followed by 10 hours of drying with hot air at 60° C. The obtained leaves were pulverized with a pulverizer so that 90% of the leaves passed through a 200 mesh screen. Thus, grass plant young leaf powder was obtained.

Water-soluble Dietary Fibers

As water-soluble dietary fibers, indigestible dextrin (PINE FIBER manufactured by Matsutani Chemical Industries Co., Ltd.) was used.

Example 1

The young leaf powder of the grass plant, powdered green tea, pine fibers, oligosaccharide, and lactic acid bacteria were mixed in the ratios shown in Table 1, indicated as Control Group, Group A, Group B and Group C.

TABLE 1

|  | Control Group | Group A | Group B | Group C |
| --- | --- | --- | --- | --- |
| Young leaves of the grass plant | — | 50 | 0 | 50 |
| Powdered green tea | — | 0 | 50 | 5 |
| Pine fibers | — | 40 | 40 | 36 |
| Oligosaccharide | — | 5 | 5 | 4.5 |
| Lactic acid bacteria | — | 5 | 5 | 4.5 |
| Total | 0 | 100 | 100 | 100 |

Unit: g

Forced oral dosages of foods of the Control Group, Group A, Group B and Group C were administered to corresponding groups of rats, each group consisting of four rats of 7 weeks age, in an amount of 100 mg/kg body weight once a day (between 9 a.m. and 10 a.m.) for two weeks with a sounde for stomach.

After the last dosage, a 12 hour fast was conducted, and a mixture of carbon tetrachloride and olive oil in a ratio of 1:1 was administered intraperitoneally. Then, 24 hours later, the rats were dissected and the liver was removed and measured with respect to the SOD activity in the mitochondrial fraction. Table 2 shows the results.

In Table 2, the figures on the right side indicate relative values when the SOD activity of the Control Group is 100.

TABLE 2

| SOD activity in the liver (U/g of liver wet weight) | | |
| --- | --- | --- |
| Control Group | 321.6 | (100) |
| Group A | 452.1 | (141) |
| Group B | 391.8 | (122) |
| Group C | 1056.1 | (329) |

According to the results, SOD activities of Group A that contains no powdered green tea and Group B that contains no grass plant leaves are 1.2 to 1.4 times higher than those of the Control Group, whereas SOD activity of Group C that contains both the grass plant young leaves and the powdered green tea was 3.3 times higher. This means that Group C activates SOD at least 5 times more than Group A and Group B.

Industrial Applicability

The food containing the grass plant young leaf powder and the powdered green tea of the present invention is excellent in enhancing SOD activity in the body. Moreover, addition of water-soluble dietary fibers, oligosaccharide, lactic acid bacteria or the like makes it possible to prevent colon and rectum cancer, improve the intestinal environment, suppress the absorption of cholesterol, and further to purify blood, for example, by suppressing an increase of the blood glucose level after eating, so that the food of the present invention is expected to be effective for dietary therapy for diabetes.

I claim:

1. A processed food for activating superoxidase dismutase, comprising 30 to 70% by weight of grass plant young leaf powder selected from the plants consisting of barley, wheat, rye, and oats; 1 to 50% by weight of water-soluble dietary fibers selected from the group consisting of alginic acid, indigestible dextrin, Guar gum hydrolysate, and glucomannan; 1 to 10% by weight of oligosaccharides; 0.5 to 5% by weight of powdered lactic acid bacteria; and 5 to 15% by weight of powdered green tea.

2. The processed food of claim 1, further comprising a calcium-containing substance and maltitol.

3. A method for producing a processed food for activating superoxidase dismutase, comprising mixing 30 to 70% by weight of grass plant young leaf powder selected from the plants consisting of barley, wheat, rye, and oats; 1 to 50% by weight of water-soluble dietary fibers selected from the group consisting of alginic acid, indigestible dextrin, Guar gum hydrolysate, and glucomannan; 1 to 10% by weight of oligosaccharides; 0.5 to 5% by weight of powdered lactic acid bacteria; and 5 to 15% by weight of powdered green tea.

4. A method for activating superoxidase dismutase in a mammal comprising, administering a processed food that comprises 30 to 70% by weight of grass plant young leaf powder selected from the plants consisting of barley, wheat rye, and oats; 1 to 50% by weight of water-soluble dietary fibers selected from the group consisting of alginic acid, indigestible dextrin, Guar gum hydrolysate, and glucomannan; 1 to 10% by weight of oligosaccharides; 0.5 to 5% by weight of powdered lactic acid bacteria; and 5 to 15% by weight of powdered green tea to the mammal.

5. The method of claim 4, wherein the processed food further comprises a calcium-containing substance and maltitol.

\* \* \* \* \*